United States Patent
Olsommer

(10) Patent No.: US 10,167,050 B2
(45) Date of Patent: Jan. 1, 2019

(54) ELECTRIC ASSIST DEVICE FOR A BICYCLE AND BICYCLE EQUIPPED WITH SUCH A DEVICE

(71) Applicant: COMPAGNIE GENERALE DES ETABLISSEMENTS MICHELIN, Clermont-Ferrand (FR)

(72) Inventor: David Olsommer, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/547,892

(22) PCT Filed: Feb. 9, 2016

(86) PCT No.: PCT/EP2016/052668
§ 371 (c)(1),
(2) Date: Aug. 1, 2017

(87) PCT Pub. No.: WO2016/128369
PCT Pub. Date: Aug. 18, 2016

(65) Prior Publication Data
US 2017/0355419 A1    Dec. 14, 2017

(30) Foreign Application Priority Data
Feb. 11, 2015   (FR) ..................................... 15 51113

(51) Int. Cl.
*B62M 6/75*   (2010.01)
*B62M 6/50*   (2010.01)
(Continued)

(52) U.S. Cl.
CPC .................. *B62M 6/50* (2013.01); *B62J 7/04* (2013.01); *B62M 6/75* (2013.01); *H02K 7/006* (2013.01);
(Continued)

(58) Field of Classification Search
CPC .................................. B62M 6/40; B62M 6/75
See application file for complete search history.

(56) References Cited

U.S. PATENT DOCUMENTS

| 3,841,428 A | * | 10/1974 | Bialek | .................... B62M 13/04 180/65.1 |
| 3,978,936 A | * | 9/1976 | Schwartz | ................. B62M 6/75 180/222 |

(Continued)

FOREIGN PATENT DOCUMENTS

| DE | 203 14 210 U1 | 2/2004 |
| FR | 2 998 858 A1 | 6/2014 |

(Continued)

OTHER PUBLICATIONS

International Search Report issued by WIPO dated May 2, 2016, in connection with International Application No. PCT/EP2016/052668 (with English translation attached).

*Primary Examiner* — Tony H Winner
(74) *Attorney, Agent, or Firm* — Venable LLP

(57) ABSTRACT

An electrical assistance device for a bicycle includes an electrical machine, a drive roller, an actuatable positioner, and a controller. The electrical machine includes a support arm and a rotor shaft, which carries the drive roller via a free wheel. The support arm is mounted on the bicycle by a pivot shaft, which pivots between a drive position and a separated position. The actuatable positioner releasably holds the support arm in the separated position. The controller controls operation of the electrical machine and is able to cause the electrical machine to produce a motive torque in a direction toward a wheel of the bicycle driven in forward movement. The controller also is able to deliver an electrical pulse to the electrical machine to produce a reaction torque
(Continued)

in a direction opposite to the motive torque to cause the support arm to pivot, causing actuation of the positioner.

12 Claims, 5 Drawing Sheets

(51) Int. Cl.
    *B62J 7/04*           (2006.01)
    *H02K 7/00*         (2006.01)
    *H02K 7/108*       (2006.01)
    *B62M 6/90*        (2010.01)

(52) U.S. Cl.
    CPC ............. *H02K 7/1085* (2013.01); *B62M 6/90* (2013.01); *H02K 2207/00* (2013.01)

(56) References Cited

U.S. PATENT DOCUMENTS

| | | | |
|---|---|---|---|
| 4,418,784 A * | 12/1983 | Fox | F02B 75/34 180/221 |
| 5,799,747 A | 9/1998 | Olsen | 180/221 |
| 9,475,546 B2 | 10/2016 | Olsommer et al. | B62M 6/75 |
| 9,533,734 B2 | 1/2017 | Olsommer et al. | B62M 6/75 |
| 2011/0232985 A1 * | 9/2011 | Lee | B62M 6/45 180/297 |
| 2013/0319781 A1 * | 12/2013 | Carolin | B62M 6/75 180/206.8 |
| 2015/0336632 A1 | 11/2015 | Olsommer et al. | B62M 6/75 |
| 2016/0167734 A1 | 6/2016 | Olsommer | B62M 6/75 |
| 2016/0167735 A1 | 6/2016 | Olsommer | B62M 6/75 |
| 2016/0257374 A1 * | 9/2016 | Guida | B62M 6/75 |
| 2018/0057108 A1 * | 3/2018 | Scherer | B62M 6/75 |
| 2018/0118298 A1 * | 5/2018 | David | B60B 19/00 |

FOREIGN PATENT DOCUMENTS

| | | |
|---|---|---|
| WO | WO 2010/134793 A2 | 11/2010 |
| WO | WO 2014/086728 A1 | 6/2014 |

* cited by examiner

ELECTRIC ASSIST DEVICE FOR A BICYCLE AND BICYCLE EQUIPPED WITH SUCH A DEVICE

FIELD OF THE INVENTION

The present invention relates to electrical assistance devices for a bicycle and to bicycles equipped with such devices.

RELATED ART

Various electrical assistance devices for a bicycle are currently known.

There are devices which use an electrical machine placed in the hub of one of the wheels of the bicycle.

There is a device, described in document DE-20314210-U1, in which a pinion of an electrical motor meshes with internal teeth of the rim of the front wheel of a bicycle.

BRIEF DESCRIPTION OF EMBODIMENTS OF THE INVENTION

There is furthermore a device, described in document WO 2014/086728-A1, in which a pinion of an electrical motor meshes with lateral teeth of a tire of a wheel of the bicycle.

The object of the present invention is to provide an improved electrical assistance device.

According to one embodiment, an electrical assistance device for a bicycle is provided, which comprises:

an electrical machine provided with a support arm and comprising a rotor shaft that carries a drive roller by means of a free wheel, the support arm being mountable on the bicycle by means of a pivot shaft, the pivot axis of which is at a distance from the axis of the rotor shaft, so that the support arm can pivot in a first pivoting direction in order to place the drive roller in contact with an annular region of the wheel of the bicycle, in a driving position, and can pivot in a second pivoting direction in order to separate the drive roller from this annular contact region, a restoring means acting on the said support arm in the said first pivoting direction, actuable positioning means for holding the support arm releasably in a separated position of the drive roller, and means for controlling the operation of the electrical machine, which are capable of supplying the electrical machine with electrical energy in order to produce a motive torque in the direction of the wheel of the bicycle being driven in forward movement by means of the free-wheel member and the drive roller, and are capable of delivering an electrical pulse to the electrical machine in order to produce a reaction torque in a direction opposite to the said motive torque, causing the support arm to pivot in the said second pivoting direction, causing actuation of the said positioning means.

The said control means may comprise a sensor of the forward-movement speed of the bicycle and an electronic means for delivering the pulse for setting the rotor shaft in rotation in the reverse direction selectively as a function of the signal emitted by the said speed sensor.

The said control means may comprise a sensor of rotation of the pedals of the bicycle and an electronic means for delivering the pulse for setting the rotor shaft in rotation in the reverse direction selectively as a function of the signal emitted by the said rotation sensor.

The said control means may comprise a sensor of the position of the support arm.

The said control means may comprise a control handle for the supply of the electrical machine in forward movement.

The said actuable positioning means may comprise a link rod connected to the said support arm and provided with an interlock finger, a retaining stop, a first cam for guiding the interlock finger when the support arm is pivoted in the said second pivoting direction, until this interlock finger reaches the retaining stop, in the said separated position of the drive roller, and a second cam for guiding the interlock finger when the support arm is pivoted in the said first pivoting direction, in order to release the interlock finger from the retaining stop.

The said drive roller may comprise teeth capable of engaging, in a drive position, with teeth of the said annular contact region of the wheel of the bicycle.

The said annular contact region may be arranged on a tire of the wheel of the bicycle.

The said electrical machine may comprise a rotor carried by the said rotor shaft and placed around a stator.

The said electrical machine may comprise a peripheral casing secured to the rotor shaft and carrying the rotor.

The said means for controlling the operation of the electrical machine may be capable, when the said drive roller is in the said separated position, of delivering the said electrical pulse producing the said reaction torque after production of the said motive torque.

A bicycle equipped with an electrical assistance device such as that described above is also provided.

BRIEF DESCRIPTION OF THE DRAWINGS

An electrical assistance device and a bicycle equipped with such a device will now be described by way of nonlimiting examples, illustrated by the drawing, in which.

DETAILED DESCRIPTION OF EMBODIMENTS OF THE INVENTION

Figure 1:
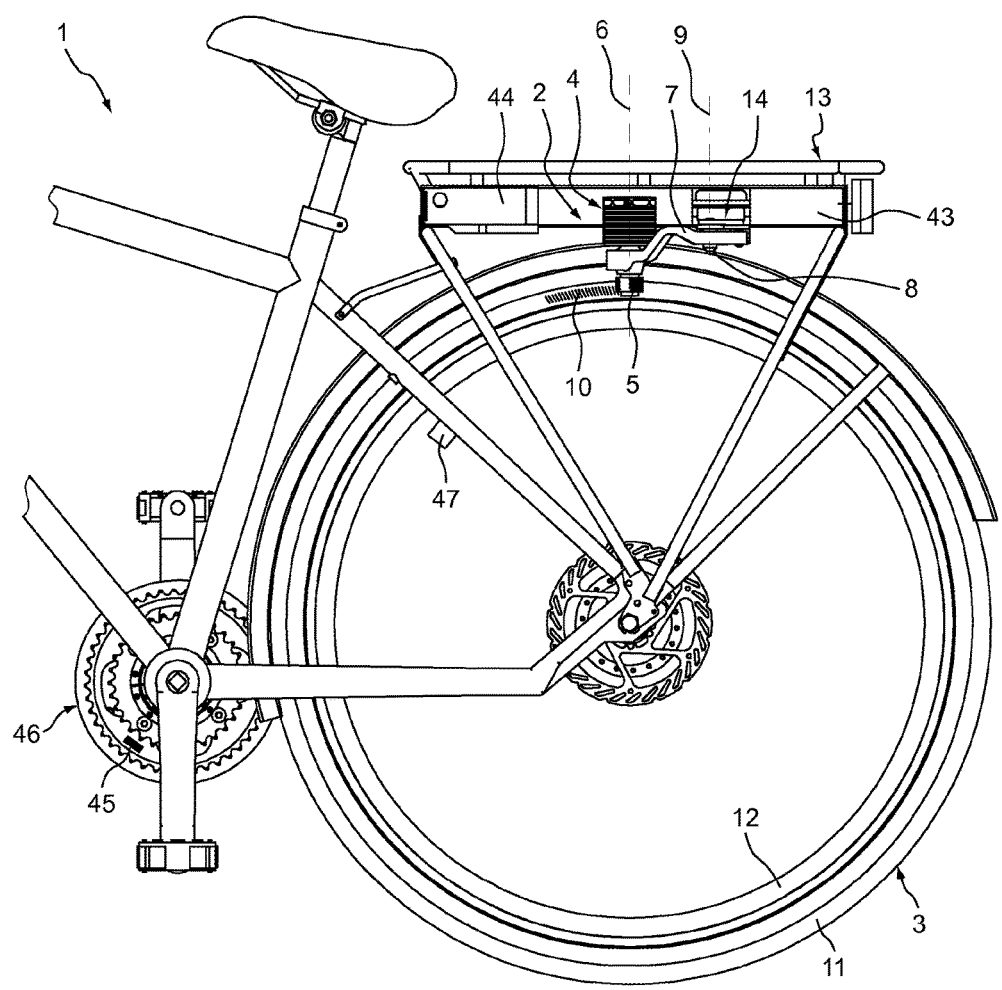
FIG. 1 represents a partial schematic side view of a bicycle equipped with an electrical assistance device.

FIG. 1 illustrates a bicycle 1 equipped with an electrical assistance device 2 that is capable of generating a motive force for driving a wheel 3 of the bicycle, for example its rear wheel, in rotation in forward movement, with a view to assisting the cyclist.

The electrical assistance device 2 comprises an electrical machine 4, which comprises a drive roller 5 rotating about an axis 6 of the machine 4 and which is provided with a lateral support arm 7 that is mounted on the bicycle by means of a pivot shaft 8, the pivot axis 9 of which lies at a distance from the axis 6 of the electrical machine 4, so that the electrical machine 4 is mounted in a cantilevered fashion.

The axes 6 and 9 are placed with respect to one another so that the support arm 7 can pivot in a first pivoting direction R1 (FIG. 4) in order to place the drive roller 5 in contact with an annular region 10 of the wheel 3 of the bicycle, in a drive position, and can pivot in a second pivoting direction R2 (FIG. 4) in order to separate the drive roller 5 from this annular contact region 10.

According to the example represented, the wheel 3 of the bicycle comprises a tire 11 mounted on a rim 12. The annular contact region 10 is provided on a side wall of the tire 11. The drive roller 5 has peripheral teeth, and the annular contact region 10 has teeth, these sets of teeth engaging with one another in the said drive position. According to a particular arrangement, the axis 6 of the machine 4 extends substantially radially with respect to this annular contact region 10. The axis 6 of the machine 4 and the axis 9 of the pivot shaft 8 are substantially parallel, so that the drive roller 5 pivots in a plane substantially parallel to the axis of the annular contact region 10. Nevertheless, the axis 6 of the machine 4 could be inclined with respect to the annular contact region 10, and the axis 6 of the machine 4 and the axis 9 of the pivot shaft 8 could be inclined with respect to one another so that the drive roller 5 pivots in a plane which is inclined with respect to the axis of the annular contact region 10.

According to the particular exemplary embodiment represented, the electrical assistance device 2 is located below a lateral part of a rear luggage carrier 13 that extends above the rear wheel 3 of the bicycle, and the pivot shaft 8 is mounted on a fixed support plate 14 fixed below the rear luggage carrier 13, with a portion of the support arm 7 extending below this plate 14. The pivot shaft 8 is placed substantially vertically, so that the support arm 7 can pivot substantially horizontally.

According to the example represented, the electrical assistance device 2 is placed to the left of the wheel 3 and the electrical machine 4 is placed in front of the pivot shaft 8.

Figure 2:
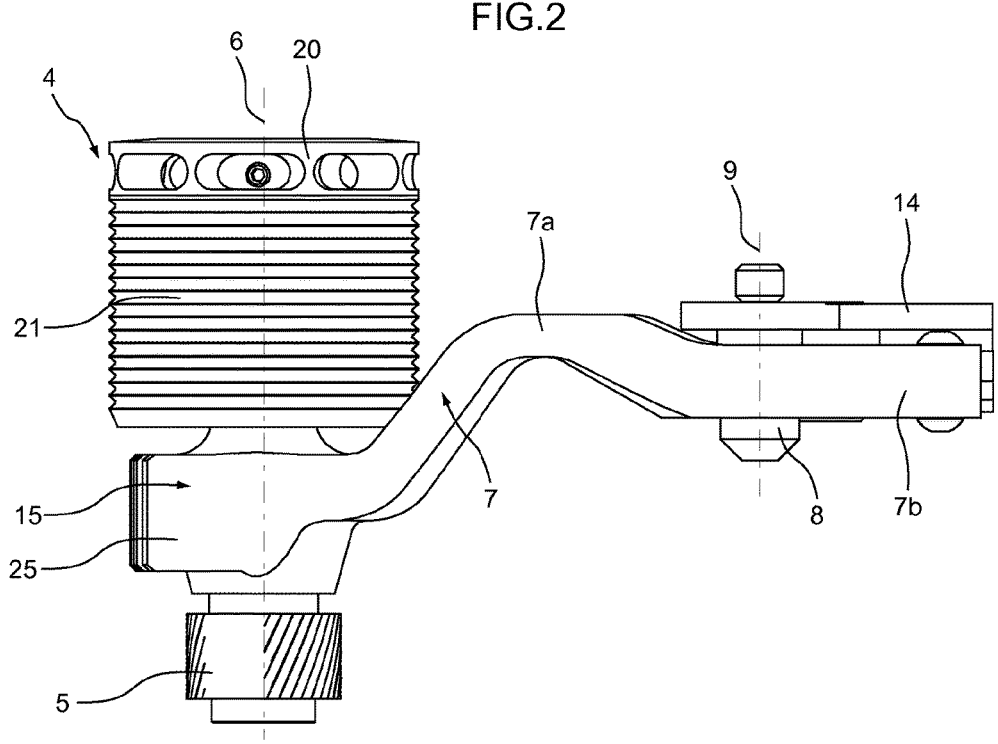
FIG. 2 represents a side view of the electrical assistance device.
Figure 3:
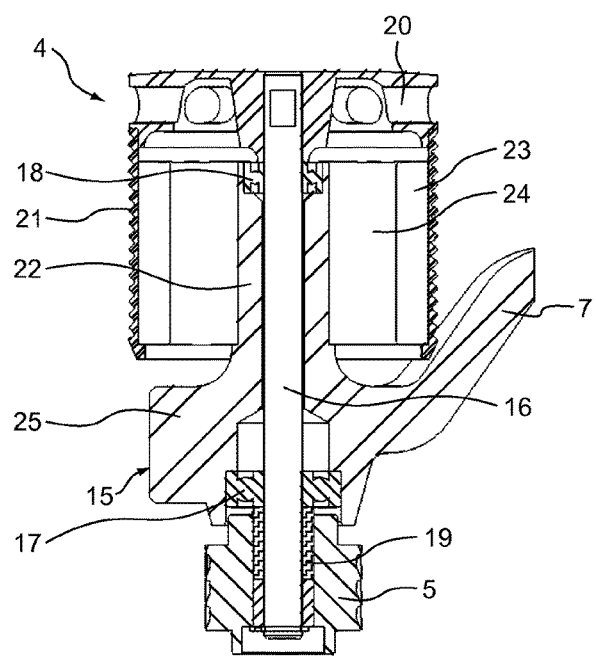
FIG. 3 represents a longitudinal section of an electrical machine of the electrical assistance device.

As illustrated particularly in FIGS. 2 and 3, the electrical machine 4 comprises a support 15, for example formed in a single piece with the support arm 7, which carries a rotor shaft 16, for example by means of two rolling bearings 17 and 18 spaced apart axially. The drive roller 5 is mounted on a cantilevered lower end of the rotor shaft 16 by means of a free wheel 19. This free wheel 19 is arranged in such a way that, when supplied with electrical energy, the electrical machine 4 can produce a motive torque and make the rotor shaft 16 rotate in one rotation direction and transmit its rotational movement to the drive roller 5, in the direction of the wheel 3 of the bicycle being driven in rotation in forward movement, in particular when the drive roller 5 is engaged with the annular region 10 of the wheel 3.

According to the alternative embodiment illustrated, the rotor shaft 16 passes through the support 15 and is provided on its upper end with a radial disk 20 equipped with a cylindrical casing 21 extending at a radial distance from an upper core 22 of the support 15. This cylindrical casing 21 is internally provided with a rotor 23, and the core 22 is externally provided with a stator 24. The electrical machine 4 is therefore one with a rotating outer cage, with the support arm 7 extending laterally starting from a lower part 25 of the support 15, this lower part being extended upwards by the upper core 22, while passing below the lower end of the cylindrical casing 21.

Means making it possible to position the support arm 7 in rotation will now be described with reference to FIGS. 4 to 7.

The support arm 7 comprises a portion 7a which extends between the pivot shaft 8 and the support 15 of the electrical machine 4, and it comprises a portion 7b which continues this portion 7a beyond the pivot shaft 8.

A restoring spring 26 is interposed horizontally between the portion 7b of the support arm 7 and a projecting part 27 of the fixed support plate 14, and acts on the support arm 7 in the first pivoting direction R1.

The electrical assistance device 2 comprises actuable positioning means 28 for determining angular positions of the support arm 7, more precisely for holding the support arm 7 releasably in an angular retaining position corresponding to the aforementioned separated position of the drive roller 5 and for the support arm to reach an angular release position corresponding to the aforementioned drive position of the guide roller 5.

The positioning means 28 can be actuated under the effect of an electrical pulse delivered to the electrical machine 4, in order to produce a reaction torque between the stator 24 and the rotor 23, in a direction opposite to the said motive torque. This reaction torque is made possible by the existence of the free wheel 19. This reaction torque causes pivoting of the support arm 7 in the pivoting direction R2 against the restoring spring 26, so that the support arm 7 can pass from its angular holding position to its angular release position, and conversely from its angular release position to its angular holding position.

According to one alternative embodiment, the positioning means 28 comprise an elongate link rod 29, situated in a plane perpendicular to the pivot shaft 8, one end of which is mounted in an articulated fashion on the end of the portion 7b of the support arm 7 by an axle 30, and which carries a projecting vertical interlock finger 31 in the vicinity of its other end.

The positioning means 28 comprise a guide plate 32 fixed perpendicularly to the pivot shaft 8 below the fixed support plate 14.

The guide plate 32 has an opening 33 roughly in the shape of a heart, and forms a retaining stop 34 lying inside this opening 33 and at a distance from the side walls of the latter. The interlock finger 31 of the link rod 29 is engaged in the guide opening 33 and can move in the space surrounding the retaining stop 34.

Figure 4:
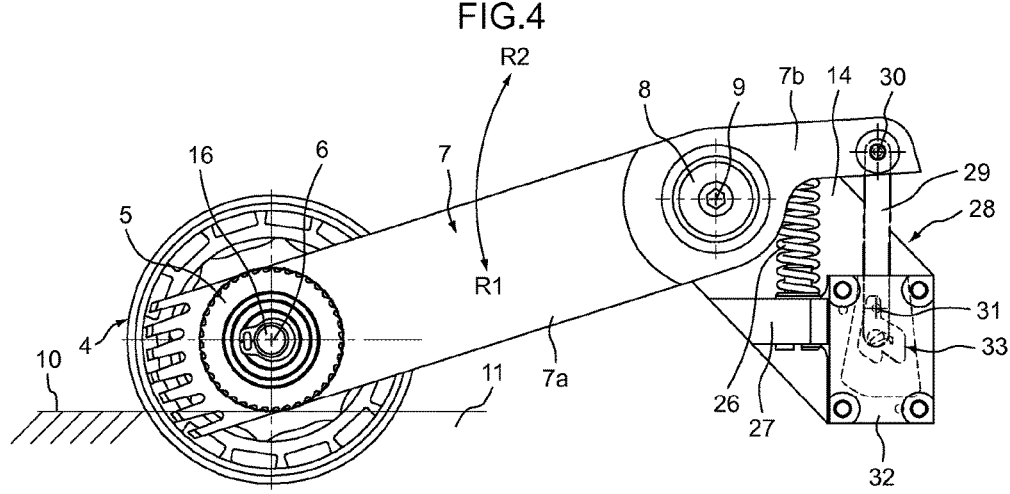
FIG. 4 represents a view from below of the electrical assistance device in a drive position.
Figure 5:
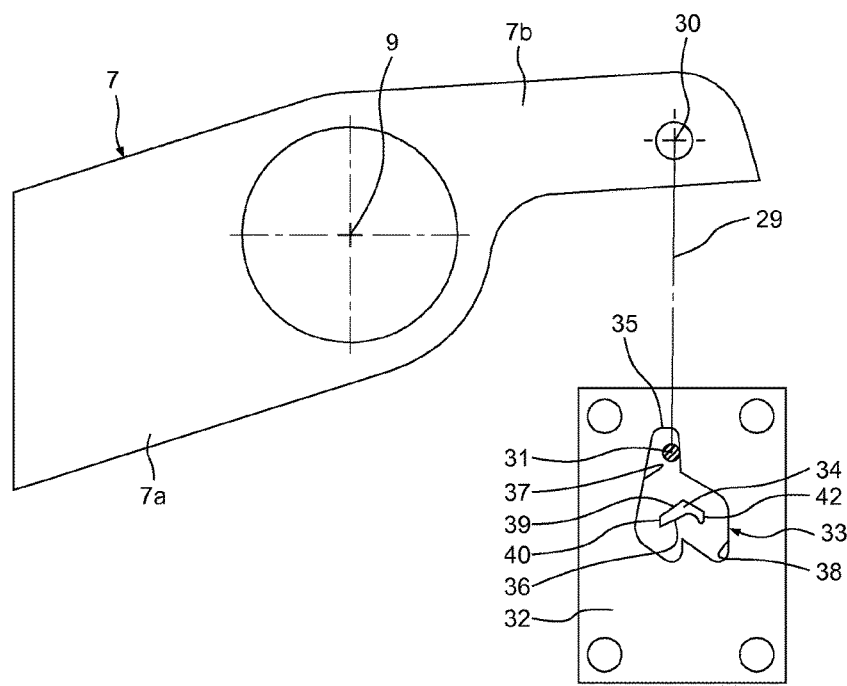
FIG. 5 represents an enlarged partial view from below of the electrical assistance device in its drive position.

As illustrated in FIGS. 4 and 5, in the aforementioned drive position the interlock finger 31 lies in the vicinity of the pointed end 35 of the opening 33, in a free position. In this drive position, the corresponding angular release position of the support arm 7 is determined by the drive roller 5 pressing on the annular contact region 10 of the wheel 3, under the effect of the restoring spring 26. The interlock finger 31 being free in the direction of the pivoting of the support arm 7, the restoring spring 26 determines the contact force of the drive roller 5 on the annular contact region 10 of the wheel 3 of the bicycle.

Figure 6:
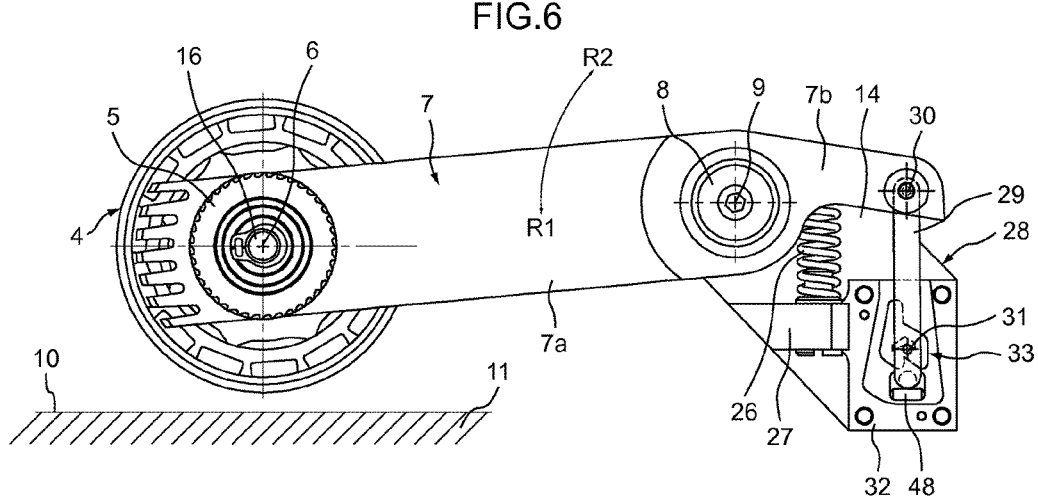
FIG. 6 represents a view from below of the electrical assistance device in a separated position.
Figure 7:
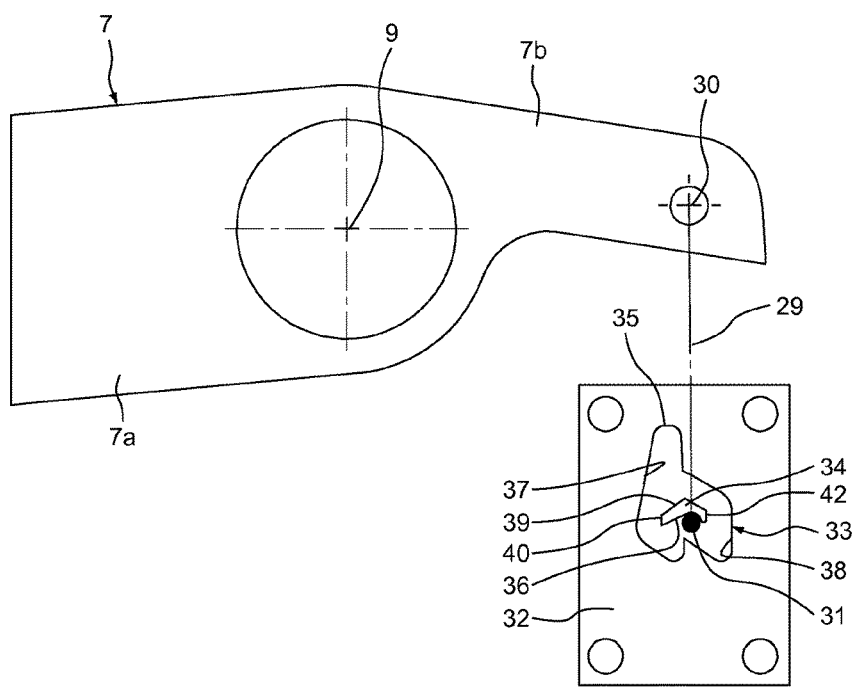
FIG. 7 represents an enlarged partial view from below of the electrical assistance device in its separated position.

As illustrated in FIGS. 6 and 7, in a determined separated position, the interlock finger 31 is interlocked on a hollowed face 36 of the retaining stop 34, on the opposite side from the axle 30, and is held in this interlocked retaining position under the effect of the spring 26, thus holding the support arm 7 in an angular position in which the drive roller 5 is held in a position separated from the annular drive region 10 of the wheel 3 of the bicycle.

One side of the opening 33 determines a first guide cam 37 and the other side determines a second guide cam 38. The retaining stop 34 determines a guide cam 39 on the opposite side from its hollowed face 36.

The first guide cam 37 and the guide cam 39 are used to guide the interlock finger 31 so that, under the effect of an electrical pulse applied to the electrical machine 4, this interlock finger 31, against the restoring spring 26, goes around a lateral end 40 of the retaining stop 34 during its forward movement from its aforementioned free position (FIGS. 4 and 5), then, under the effect of the restoring spring 26 and in a return movement, it is placed bearing on the hollowed face 36 of the retaining stop 34, in its aforementioned interlocked position (FIGS. 5 and 6). This being the case, the drive roller 5 passes from its drive position (FIG. 4) to its separated position (FIG. 6).

The second guide cam 37 is used to guide the interlock finger 31 so that, under the effect of an electrical pulse applied to the electrical machine 4, this interlock finger 31 moves away from the hollowed face 36 of the retaining stop 34, against the restoring spring and in a forward movement from its interlocked position (FIGS. 6 and 7), then, under the effect of the restoring spring 26 and in a return movement, goes around the other lateral end 42 of the retaining stop 34 to be placed on the hollowed face 36 of the retaining stop 34, in its aforementioned release position (FIGS. 4 and 5). This being the case, the drive roller 5 passes from its separated position (FIG. 6) to its drive position (FIG. 4).

As illustrated in FIG. 1, the bicycle is equipped with an electrical battery 43 and with an electronic unit 44 for controlling the electrical energy supply of the electrical machine 4, which are for example fixed below the luggage carrier 13. A forward-movement rotation sensor 45 is provided in order to detect the rotation of the pedals 46 of the bicycle. A speed sensor 47 is furthermore provided in order to detect the speed of the bicycle in forward movement.

Furthermore, as illustrated in FIG. 6, a position sensor 48 is provided in order to detect the extreme positions, for example of the link rod 29, corresponding to the drive and separated positions of the drive roller 5.

Figure 8:
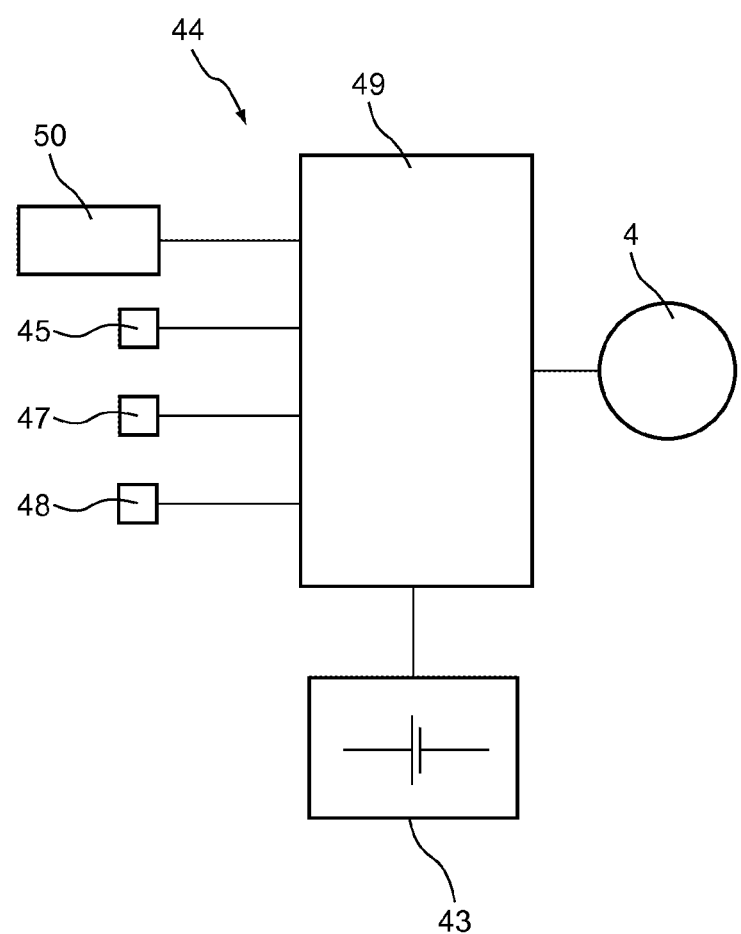
FIG. 8 represents an electronic diagram of an electronic control unit of the electrical assistance device.

As illustrated in FIG. 8, the electronic unit 44 comprises an electronic circuit 49 for controlling the electrical energy supply of the electrical machine 4. This electronic circuit 49 receives the signal delivered by the rotation sensor 45, the signal delivered by the speed sensor 47, the signal delivered by the position sensor 48, and the signal delivered by a handle 50 (not represented in FIG. 1) for acceleration or deceleration control, which can be operated by the cyclist. The electronic circuit 49 is connected to the battery 43 and to the electrical machine 4.

The electronic circuit 49 may be programmed in order to operate particularly in the following way, according to the signals delivered by the said sensors.

In an initial situation, the pedals 46 are at rest and the drive roller 5 is in its position separated from the annular contact region 10 of the wheel 3 of the bicycle.

When the pedals 46 turn, the electronic circuit 49 sends an electrical pulse to the electrical machine 4 in order to cause a movement of the rotor shaft 16 in the reverse direction, and, as described above, to cause the guide roller 5 to pass from its separated position to its drive position. The duration of such an electrical pulse may be of the order of one tenth of a second.

So long as the speed of the bicycle is less than, for example, eight kilometers per hour, the drive roller 5 is kept in its drive position.

When the speed of the bicycle lies between these eight kilometers per hour and, for example, twenty-five kilometers per hour, the electronic circuit 49 sends, on the one hand, an electrical pulse to the electrical machine 4 in order to produce the aforementioned reaction torque and, as described above, to cause the drive roller 5 to pass from its drive position to its separated position if the pedals 46 are at rest, and, on the other hand, an electrical pulse to the electrical machine 4 in order to produce the reaction torque and, as described above, to cause the drive roller 5 to pass from its separated position to its drive position if the pedals 46 are turning in forward movement.

According to one alternative embodiment, and under the control of the said sensors, when the drive roller 5 is in its separated position, if the pedals 46 are turning in forward movement, the electrical machine 4 is supplied in order to produce, in a first phase, a motive torque making it possible to bring the drive roller 5 to a speed corresponding substantially to the speed of the annular contact region. Then, in a second phase, the electrical pulse is delivered to the electrical machine 4 in order to produce the reaction torque and, as described above, to cause the drive roller 5 to pass from its separated position to its drive position. Secondly, a motive torque is again applied. This avoids the shocks, the noise and the wear which could result from the initially stationary drive roller 5 being set abruptly in rotation when it is placed in contact with the contact region 10 of the tire.

By virtue of the handle 50, when the drive roller 5 is in its drive position, the cyclist can control the electronic circuit 49 so that the latter supplies the electrical machine 4 in such a way as to make the rotor shaft 16 rotate in the direction of forward movement with a view to delivering an assistance motive force to the wheel 3 of the bicycle.

The present invention is not limited to the examples described above.

The annular contact region 10 of the wheel 3 could, for example, be formed on the rim 12.

The electrical machine 4 could be placed at a different position of the periphery of the wheel 3, and the assistance device 2 could be mounted on the frame of the bicycle.

The positioning means 28 could have a different structure, and, in order to achieve the two positions of the support arm 7, could comprise a tilting stop member, a stop member with a spring, or a rotary stop member.

The electrical assistance device 2 could be provided in order to drive the front wheel of the bicycle.

The electronic circuit 49 could be programmed according to a control law different to that described.

The electrical machine 4 could comprise a rotor placed inside a stator.

The support arm 7 could be connected to a case of the electrical machine 4.

The present invention is not limited to the examples described above. Many alternative embodiments are possible without departing from the scope of the invention.

The invention claimed is:

1. An electrical assistance device for a bicycle, the device comprising:
   an electrical machine that includes a support arm and a rotor shaft, wherein the rotor shaft supports a drive roller via a free-wheel member, wherein the support arm includes a pivot shaft that is mountable on the bicycle, wherein a pivot axis of the pivot shaft is located at a distance from an axis of the rotor shaft, and wherein the support arm is pivotable in a first pivoting direction in order to place the drive roller in contact with an annular contact region of a wheel of the bicycle when in a driving position for a forward movement, and is pivotable in a second pivoting direction to a separated position in order to separate the drive roller from the annular contact region when not in a driving position for forward movement;

a restoring device that acts on the support arm in the first pivoting direction;

an actuatable positioner that holds the support arm releasably in the separated position of the drive roller; and a controller that controls operation of the electrical machine, wherein the controller supplies the electrical machine with electrical energy to produce a motive torque in a direction of the wheel of the bicycle being driven in the forward movement via a free-wheel member and the drive roller, and wherein the controller delivers an electrical pulse to the electrical machine to produce a reaction torque in a direction opposite to the direction of the motive torque when the bicycle is not being driven in the forward movement, causing the support arm to pivot in the second pivoting direction, and causing actuation of the positioner.

2. The device according to claim 1, wherein the controller includes a speed sensor that senses a forward-movement speed of the bicycle, and wherein the controller delivers an electronic signal for selectively setting the rotor shaft in rotation in a reverse direction as a function of the electronic signal emitted by the speed sensor.

3. The device according to claim 1, wherein the controller includes a rotation sensor that senses a rotation of pedals of the bicycle, and wherein the controller delivers an electronic signal for selectively setting the rotor shaft in rotation in a reverse direction as a function of the electronic signal emitted by the rotation sensor.

4. The device according to claim 1, wherein the controller includes a position sensor that senses a position of the support arm.

5. The device according to claim 1, wherein the controller includes a control handle, which provides a signal causing the controller to supply the electrical machine with the electrical energy when the bicycle is being driven in the forward movement.

6. The device according to claim 1, wherein the actuatable positioner includes:
a link rod connected to the support arm and provided with an interlock finger,
a retaining stop,
a first cam, which guides the interlock finger when the support arm is pivoted in the second pivoting direction until the interlock finger reaches the retaining stop corresponding to the separated position of the drive roller, and
a second cam, which guides the interlock finger when the support arm is pivoted in the first pivoting direction, in order to release the interlock finger from the retaining stop.

7. The device according to claim 1, wherein the drive roller includes teeth structured to, when in a drive position, engage with teeth of the annular contact region of the wheel of the bicycle.

8. The device according to claim 1, wherein the annular contact region is arranged on a tire of the wheel of the bicycle.

9. The device according to claim 1, wherein the electrical machine includes a rotor supported by the rotor shaft and positioned around a stator.

10. The device according to claim 9, wherein the electrical machine includes a peripheral casing secured to the rotor shaft and supporting the rotor.

11. The device according to claim 1, wherein, when the drive roller is in the separated position, the controller delivers an electrical signal for producing the reaction torque after production of the motive torque.

12. A bicycle comprising:
a wheel;
a support; and
an electrical assistance device that includes:
(a) an electrical machine that includes a support arm and a rotor shaft, wherein the rotor shaft supports a drive roller via a free-wheel member, wherein the support arm includes a pivot shaft that is mountable on the support, wherein a pivot axis of the pivot shaft is located at a distance from an axis of the rotor shaft, and wherein the support arm is pivotable in a first pivoting direction in order to place the drive roller in contact with an annular contact region of the wheel when in a driving position for forward movement, and is pivotable in a second pivoting direction to a separated position in order to separate the drive roller from the annular contact region when not in a driving position for a forward movement,
(b) restoring device that acts on the support arm in the first pivoting direction,
(c) an actuatable positioner that holds the support arm releasably in the separated position of the drive roller, and
(d) a controller that controls operation of the electrical machine,
wherein the controller supplies the electrical machine with electrical energy to produce a motive torque in a direction of the wheel when being driven in the forward movement via a free-wheel member and the drive roller, and
wherein the controller delivers an electrical pulse to the electrical machine to produce a reaction torque in a direction opposite to the direction of the motive torque when not being driven in the forward movement, causing the support arm to pivot in the second pivoting direction, and causing actuation of the positioner.

* * * * *

UNITED STATES PATENT AND TRADEMARK OFFICE
CERTIFICATE OF CORRECTION

| | | |
|---|---|---|
| PATENT NO. | : 10,167,050 B2 | Page 1 of 1 |
| APPLICATION NO. | : 15/547892 | |
| DATED | : January 1, 2019 | |
| INVENTOR(S) | : David Olsommer | |

It is certified that error appears in the above-identified patent and that said Letters Patent is hereby corrected as shown below:

In the Claims

Column 8:
Line 36, Claim 12 "restoring" should read --a restoring--.

Signed and Sealed this
Third Day of September, 2019

Andrei Iancu
*Director of the United States Patent and Trademark Office*